United States Patent
Tamura (10) Patent No.: US 8,634,770 B2
(45) Date of Patent: Jan. 21, 2014

(54) PORTABLE TERMINAL DEVICE

(75) Inventor: Toshiya Tamura, Kokubunji (JP)

(73) Assignee: Fujitsu Mobile Communications Limited, Kawasaki (JP)

( * ) Notice: Subject to any disclaimer, the term of this patent is extended or adjusted under 35 U.S.C. 154(b) by 862 days.

(21) Appl. No.: 11/899,373

(22) Filed: Sep. 5, 2007

(65) Prior Publication Data

US 2008/0182514 A1 Jul. 31, 2008

(30) Foreign Application Priority Data

Jan. 31, 2007 (JP) ................. 2007-022255

(51) Int. Cl.
*H04B 5/00* (2006.01)

(52) U.S. Cl.
USPC ......... 455/41.1; 455/3.06; 455/41.2; 370/389

(58) Field of Classification Search
USPC ....................... 455/3.06, 41.1, 41.2
See application file for complete search history.

(56) References Cited

U.S. PATENT DOCUMENTS

| | | | |
|---|---|---|---|
| 6,546,426 B1 * | 4/2003 | Post | 709/231 |
| 2006/0062215 A1 * | 3/2006 | Lam | 370/389 |
| 2007/0232222 A1 * | 10/2007 | de Jong | 455/3.06 |

FOREIGN PATENT DOCUMENTS

JP 2005-347899 A 12/2005

* cited by examiner

*Primary Examiner* — Edward Urban
*Assistant Examiner* — Hsin-Chun Liao
(74) *Attorney, Agent, or Firm* — Maschoff Brennan (57) ABSTRACT

The present invention offers a portable terminal device in which, the jitter control unit controls the transmission buffer unit in such a manner as not to output the audio data buffered in the transmission buffer unit to the Bluetooth communication unit when the main control unit determines that the content that is to be subjected to a reproduction process contains video data, and when an underflow arises at the transmission buffer unit, and abandons the audio data that is not output to the Bluetooth communication unit at the time indicated by the time management unit.

7 Claims, 4 Drawing Sheets

PORTABLE TERMINAL DEVICE

CROSS-REFERENCE TO RELATED APPLICATIONS

This application is based upon and claims the benefit of priority from prior Japanese Patent Application No. 2007-022255, filed Jan. 31, 2007, the entire contents of which are incorporated herein by reference.

BACKGROUND OF THE INVENTION

1. Field of the Invention

The present invention relates to a portable device such as a cellular telephone.

2. Description of the Related Art

With the technology of portable devices including cellular telephones improving at a rapid pace in recent years, portable devices have come to be utilized for various purposes. For instance, it is becoming popular to view video content and listen to music content on a cellular telephone or equipment connected to the cellular telephone.

Also, various short-range wireless transmission systems intended for a transmission distance up to several tens of meters have been developed. With such a short-range wireless transmission system, a method of transmitting music data and the like at home, for example, has been in put into actual use. Bluetooth (trademark) is an example of this method.

By using a given profile defined in short-range wireless transmission technology, music data can be transmitted and received between a portable device such as a cellular telephone and an external device such as a headset.

In relation to this method, Jpn. Pat. Appln. KOKAI Publication No. 2005-347839 (Yamada) discloses a music data transmitting device and a music data reproducing device for suppressing sound skipping caused by a data underflow in the music data reproducing device.

According to Yamada, when receiving a retransmission request signal from a music data reproducing device while the received data is not in a favorable condition, the music data transmitting device resends the designated music data, for example, L-channel data out of the requested frame of data. Based on the sound levels of both L and R channels immediately before the resending request and the resent L-channel data, the music data reproducing device generates R-channel data based on the resent music data and the sound levels. Then, the music data reproducing device outputs a music signal corresponding to the L-channel data from the speaker L, and outputs a music signal corresponding to the R-channel data from the speaker R.

The technology disclosed in Yamada thereby suppresses the underflow of data in the music data reproducing device.

A portable device such as a cellular telephone has a large variety of functions unlike an ordinary device dedicated to music reproduction. Thus, the following problems may arise when the music content reproducing process conflicts with other processes.

For example, when audio data of music content is transmitted from a cellular telephone to a headset by means of Bluetooth communication, an underflow of audio data may occur in the cellular telephone. This causes annoying skips in the sound output from the headset. Furthermore, a similar problem arises when the content transmitted from the cellular telephone to the headset includes motion video content containing video data in addition to audio data.

Yamada, however, neither discloses nor suggests such problems or a means :for solving the problems.

BRIEF SUMMARY OF THE INVENTION

The present invention has been conceived in light of the above situation. The purpose of the present invention is to provide a portable terminal device such as a cellular telephone that does not produce annoying sound skipping or a discrepancy between the reproduced audio and video that are supposed to maintain synchronization when the portable terminal device transmits audio data of music content or motion video content to an external remote device such as a headset, where the audio data is reproduced and output.

In order to achieve the above purpose, a portable terminal device according to the first embodiment of the present invention comprises: a storage unit for storing audio data and video data; a short-range wireless communication unit for transmitting the audio data to an external device having a short-range communication function in short-range wireless communication; a content type determining unit for determining the type of content that is to be subjected to a reproduction process; a transmission buffer unit for buffering the audio data that is to be transmitted to the external device by the short-range wireless communication unit and outputting the audio data to the short-range wireless communication unit; a time management unit having a timer function, for sending the transmission buffer unit an instruction of transmitting the audio data to the short-range wireless communication unit based on time measured by the timer function; and a jitter control unit for determining whether an underflow arises at the transmission buffer unit and, when determining that the underflow arises at the transmission buffer unit, controlling the transmission buffer unit in such a manner as not to output the audio data currently buffered in the transmission buffer unit to the short-range wireless communication unit, wherein, when the content type determining unit determines that the content to be subjected to the reproduction process contains the video data and when the underflow arises at the transmission buffer unit, the jitter control unit abandons the audio data that is not output to the short-range wireless communication unit at a time indicated by the time management unit.

In order to achieve the above purpose, a portable terminal device according to the second embodiment of the present invention comprises: a storage unit configured to store a first content containing audio data and video data and a second content containing only audio data; a video control unit configured to decode the video data-and output the decoded video data to a display; a short-range communication unit configured to connect an external device and to transmit the audio data contained in first and second contents to the external device; a content type determining unit configured to determine whether the content to be reproduced is one of the first and second contents; a buffer unit configured to buffer the audio data to be transmitted to the external device via the short-range communication unit; a timer configured to generate time information; a timing control unit configured to control transmission of the audio data in the buffer unit based on the time information; and a flow control unit configured to control the transmission of the audio data so as not to have the audio data in the buffer unit be transmitted if underflow of the audio data in the buffer unit is detected and the content type determining unit determines that the content to be reproduced is the first content.

In order to achieve the above purpose, a method for controlling data transmission according to the third embodiment of the present invention comprises:

storing a first content containing audio data and video data and a second content containing only audio data; decoding the video data and output the decoded video data to a display; connecting an external device and transmitting the audio data contained in first and second contents to the external device; determining whether the content to be reproduced is one of the first and second contents; buffering the audio data to be transmitted to the external device; generating time information; controlling transmission of the audio data based on the time information; and controlling the transmission of the audio data so as not to have the audio data transmitted if underflow of the audio data is detected and it is determined that the content to be reproduced is the first content.

The present invention provides a portable terminal device that does not produce annoying sound skipping or a discrepancy between the reproduced audio and video that are supposed to maintain synchronization when the portable terminal device transmits audio data of music content or motion video content to an external remote device such as a headset, where the audio data is reproduced and output.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

A cellular telephone according to an embodiment of the present invention is explained below with reference to the drawings.

Figure 1:
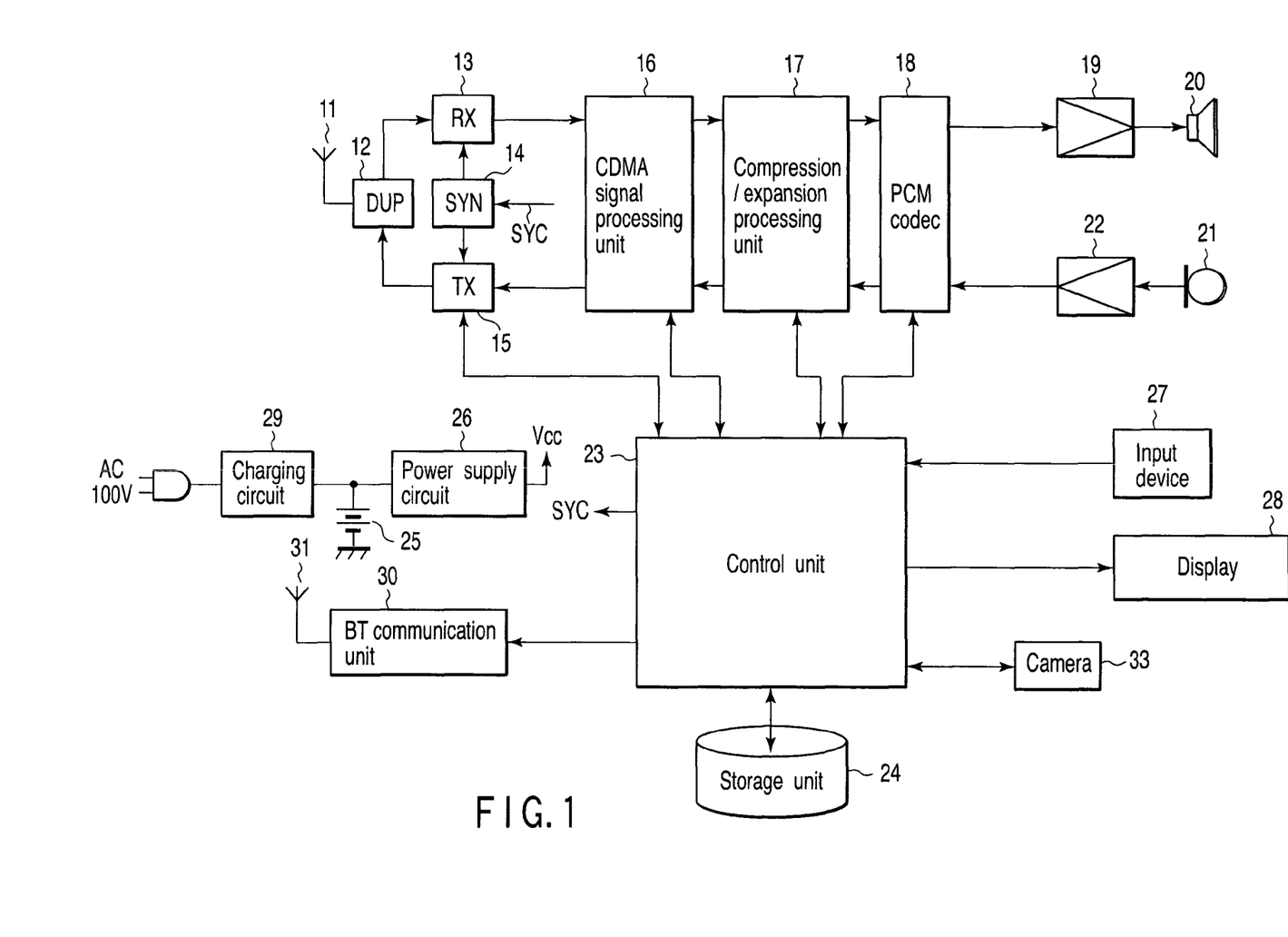
FIG. 1 is a block diagram showing the structure of a cellular telephone according to an embodiment of the present invention.

FIG. 1 is a block diagram showing the structure of a cellular telephone according to an embodiment of the present invention.

In this drawing, a radio signal transmitted from a base station (not shown) is received by an antenna 11 and then input to a receiving circuit (RX) 13 via an antenna duplexer (DUP) 12. The receiving circuit 13 mixes the received radio signal with a local oscillation signal output from a frequency synthesizer (SYN) 14 to frequency-convert (down-convert) into an intermediate frequency signal. Then, the receiving circuit 13 performs quadrature-demodulation of the down-converted intermediate frequency signal to output a reception baseband signal.

The frequency of the local oscillation signal generated by the frequency synthesizer 14 is designated by a control signal SYC output from a control unit 23 which is constituted by a microcomputer (central processing unit; CPU) or the like.

Further, the control unit 23 calculates a signal to noise ratio (S/N ratio; SNR) of the radio signal. The SNR is also referred to as C/I, and generally used when determining a data rate control (DRC) that the AT (on the terminal side) notifies the AN (on the network side) of a transmission speed needed to transmit downstream signal by the AN.

The reception baseband signal is input to a CDMA signal processing unit 16. The CDMA signal processing unit 16 is provided with a RAKE receiver. The RAKE receiver executes a despreading process on multiple paths included in the reception baseband signal by use of a spread code. Signals of the individual paths subjected to the despreading process are combined after the phases of the signals are adjusted. The reception packet data of a predetermined transmission format is thereby obtained. The reception packet data is input to a compression/expansion processing unit (hereinafter referred to as a compander) 17.

The compander 17 separates the reception packet data output from the CDMA signal processing unit 16 into types of media by use of a demultiplexing unit. The compander 17 carries out a decoding process of a separated item of data for each medium type. In telephone calling mode, for instance, the compander 17 decodes audio data included in the reception packet data, such as voice of the call, by way of a speech code.

A digital audio signal obtained from the decoding process is supplied to a PCM processing unit (hereinafter referred to as PCM code) 18. The PCM code 18 performs a PCM decoding process on the digital audio signal output from the compander 17 so as to output an analog audio signal. This analog audio signal is amplified by a amplifier 19 and then output from a speaker 20.

When audio reproducing mode is selected, the control unit 23 retrieves the desired music content from a storage unit 24 and performs a decoding process on this music content. The music content is then amplified and output via the PCM code 18 and the amplifier 19 from the speaker 20.

The image data decoded and generated by the compander 17 is input to the control unit 23. The control unit 23 displays the image data output from the compander 17 on a display 28 via a video data buffer unit 23D, which will be described later. It should be noted that the control unit 23 presents not only image data that is received but also image data that is photographed by a camera 33, which will be described later, on the display 28 via a video RAM.

When the received packet is an e-mail, the compander 17 supplies this e-mail to the control unit 23. The control unit 23 stores the e-mail in the storage unit 24. The e-mail is retrieved from the storage unit 24 in response to an operation on an input device 27, and displayed on the display 28.

On the other hand, the voice signal input from a speaker into a microphone 21 in telephone calling mode is amplified to an appropriate level by a amplifier 22 and then subjected to a PCM coding process by the PCM code 18. As a result, the voice signal is converted into a digital audio signal and input to the compander 17. In addition, the image data output from the camera 33, which will be explained later, is digitized by the control unit 23 and input to the compander 17.

An e-mail created by the control unit 23 is also input from the control unit 23 to the compander 17.

The camera 33 is a camera intended for photographing. In the cellular telephone according to the present embodiment, the image data that is displayed in the videophone mode is picked up by this camera 33.

The compander 17 detects the energy amount of input sound from a digital audio signal output from the PCM code 18, and determines the data transmission rate in accordance with the detection result. Then, the compander 17 encodes the digital audio signal into a signal of a format that agrees with the data transmission rate, thereby generating audio data.

The compander 17 also encodes the image data output from the control unit 23 or the like at a predetermined bit rate. Then, the compander 17 packetizes the audio and image data at the multiplexer/demultiplexer unit in accordance with a predetermined transmission format, and outputs the transmission packet data to the CDMA signal processing unit 16. When an e-mail is output from the control unit 23, the compander 17 also multiplexes this e-mail to transmission packet data.

The CDMA signal processing unit 16 performs a spread spectrum process on the transmission packet data output from the compander 17 by use of a spread code that is assigned to the transmission channel. The CDMA signal processing unit 16 outputs this output signal to a transmission circuit (TX) 15.

The transmission circuit 15 modulates the signal subjected to the spread spectrum process in accordance with a digital modulation system such as the quadrature phase shift keying (QOSK) system. Then, the transmission circuit 15 combines the transmission signal generated from this modulation with the local oscillation signal generated by the frequency synthesizer 14 into a radio signal by frequency conversion. Further, the transmission circuit 15 performs high-frequency amplification of this radio signal so as to reach the transmission power level designated by the control unit 23. The amplified radio signal is supplied into the antenna 11 via the antenna duplexer 12, and transmitted from this antenna 11 to a base station (not shown).

The power supply circuit 26 generates a specific operation voltage Vcc from the output of a battery 25 and supplies it to each circuit. The battery 25 is rechargeable and charged by a charging circuit 29.

The Bluetooth communication unit 30 conducts wireless communication control by means of a Bluetooth antenna 31. In other words, the Bluetooth communication unit 30 controls the conversion of the transmission data into data that supports the Bluetooth connection system, and the transmission and reception of data under the Bluetooth connection system via the Bluetooth antenna 31. In addition, as known in this field of technology, the Bluetooth communication unit 30 is also responsible for controlling the search for any nearby communication devices available for Bluetooth communication, and establishment of links before data transmission/reception.

The structure of the aforementioned control unit 23 will be explained in view of its functions, with reference to FIG. 2.

Figure 2:
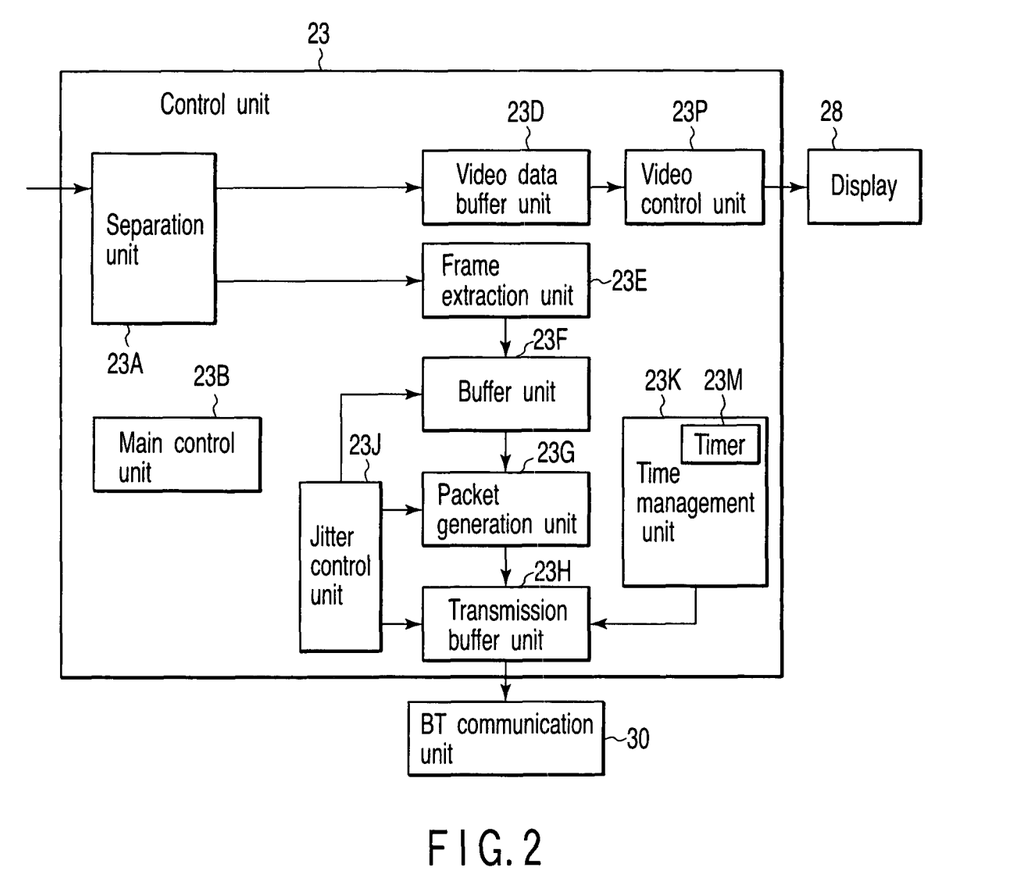
FIG. 2 is a diagram showing a detailed structure of a control unit 23 of the cellular telephone according to the embodiment from the viewpoint of its function.

As illustrated in FIG. 2, the control unit 23 comprises a separation unit 23A, a main control unit 23B, a video data buffer unit 23D, a frame extraction unit 23E, a buffer unit 23F, a packet generation unit 23G, a transmission buffer unit 23H, a jitter control unit 23J, and a time management unit 23K.

The separation unit 23A separates data that is input to the control unit 23 into video data and audio data. The main control unit 23B performs control mainly on the headset, which is a counterpart device, so that the audio data is transmitted without interruption. The video data buffer unit 23D buffers the video data and outputs it to the video control unit 23P. The video control unit 23P extracts the video data from the video data buffer unit 23D, and decodes the video data and output the decoded video data to the display 28.

The frame extraction unit 23E extracts a data frame from the audio data. The buffer unit 23F buffers the frame of audio data extracted by the frame extraction unit 23E, and outputs it to the packet generation unit 23G.

The packet generation unit 23G packetizes the input audio data and outputs it to the transmission buffer unit 23H. The transmission buffer unit 23H buffers the audio data packetized by the packet generation unit 23G. Then, the transmission buffer unit 23H transmits the resultant data to the Bluetooth communication unit 30 in accordance with the transmission instruction output from the time management unit 23K. The time management unit 23K is provided with a timer 23M, with which a transmission instruction of sending the audio data is transmitted to the transmission buffer unit 23H at each timing of the conclusion of a designated elapsed time, for example, a predetermined transmission time t, in accordance with the time measured by the timer. Incidentally, the timer 23M can be equipped outside of the time management unit 23K and generate time information to be used to control the cellar telephone.

In other words, the time management unit 23K calculates, based on the amount of audio data which the transmission buffer unit 23H outputs to the Bluetooth communication unit 30, the next transmission time t for the transmission buffer unit 23H to transmit the audio data to the Bluetooth communication unit 30, and outputs the audio data transmission instruction to the transmission buffer unit 23H in accordance with the transmission time t.

The audio data input to the Bluetooth communication unit 30 is subjected to the aforementioned process, and transmitted to an external remote device by means of Bluetooth wireless communication utilizing the Bluetooth antenna 31. As an external remote device that is a counterpart device, a headset will be considered below.

The jitter control unit 23J monitors the transmission buffer unit 23H to see if there is any underflow, and performs various controls when an underflow occurs. This is the control of the cellular telephone that is a characteristic feature of the present embodiment, and the details will be presented later.

The operation control carried out by the control unit 23, which is the characteristic feature of the present embodiment, when the Bluetooth communication unit 30 sends the audio data of the motion video content or music content to the headset is now explained with reference to the flowcharts of FIGS. 3 and 4.

Figure 3:
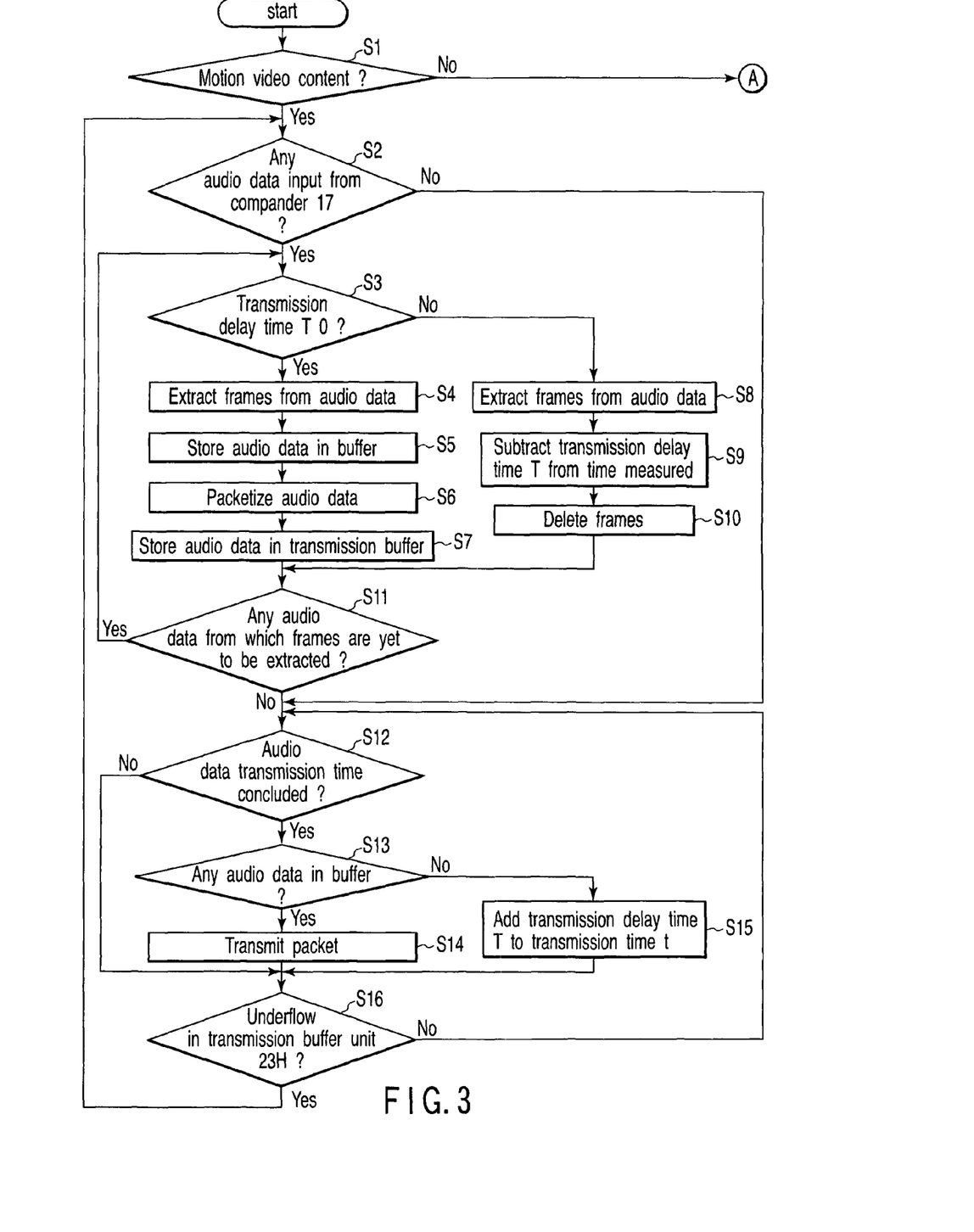
FIG. 3 is the first portion of a flowchart indicating operation control performed by the control unit, which is a characteristic feature of the cellular telephone according to the embodiment.
Figure 4:
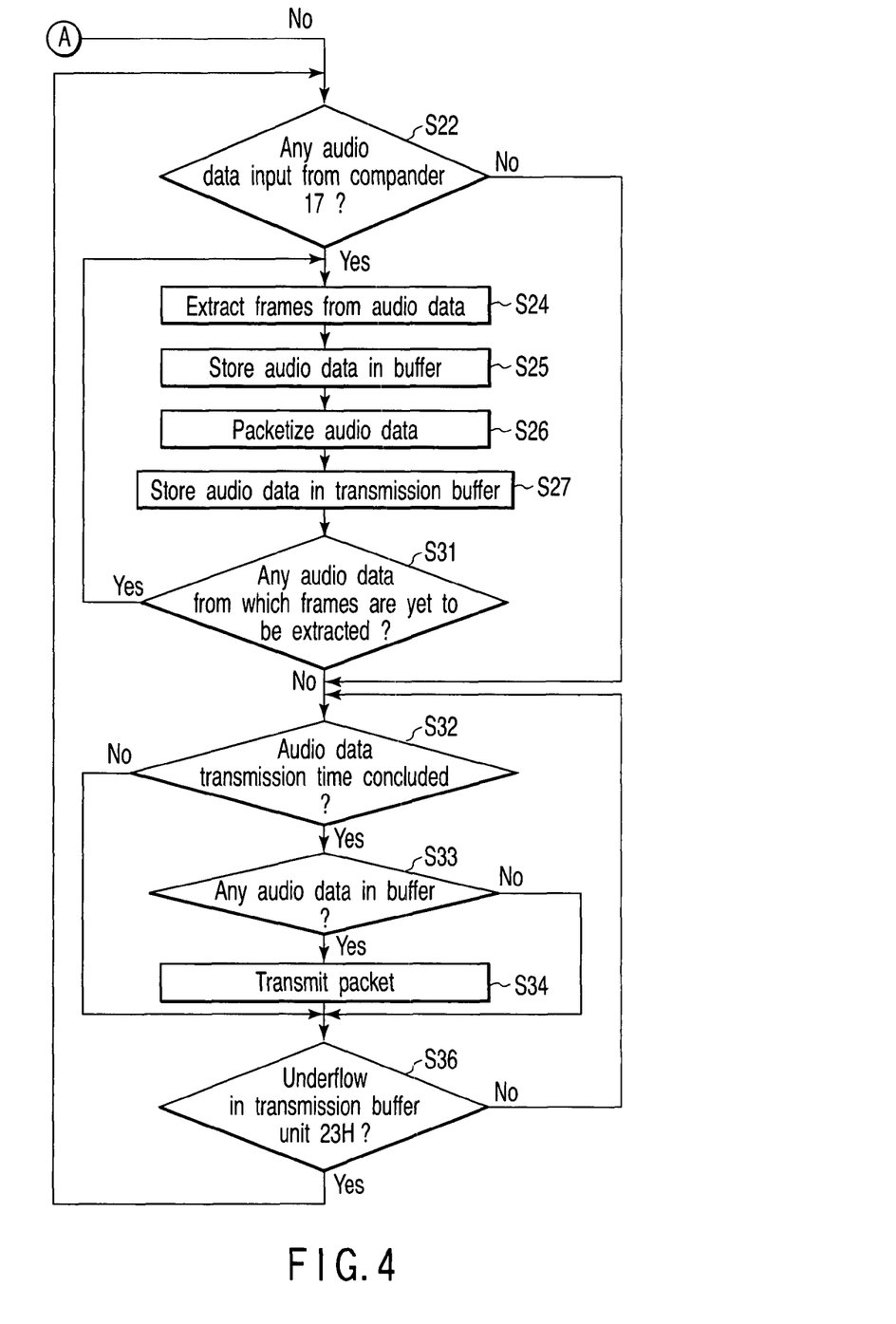
FIG. 4 is the second portion of the flowchart indicating the operation control performed by the control unit, which is a characteristic feature of the cellular telephone according to the embodiment.

FIG. 3 is a flowchart for the first portion of the operation control performed by the control unit 23, which is the characteristic feature of the cellular telephone according to the present embodiment. FIG. 4 is a flowchart for the second portion of the operation control.

When the content subjected to the reproducing process on the cellular telephone is video content, the video data of the video content is first subjected to the decoding process at the compander 17, buffered by the video data buffer unit 23D, and output to the display 28.

First, the main control unit 23B of the control unit 23 determines whether or not the content to be subjected to the reproducing process is video content containing audio data and video data (Step S1). If the determination result in Step S1 is "NO", the content to be processed is determined to be music content containing audio data, and the process proceeds to Step S22, which will be described later.

If the determination result in Step S1 is "YES", the main control unit 23B determines whether the audio data of the video content has been input from the compander 17 to the control unit 23 (Step S2). If the determination result in Step S2 is "NO", the process proceeds to Step S12, which will be described later.

If the determination result in Step S2 is "YES", the main control unit 23B determines whether or not a transmission delay time T is 0 (Step S3). The transmission delay time T is a value calculated by the time management unit 23K, indicating how much the transmission time of the audio data is delayed from the originally determined transmission time.

If the determination result in Step S3 is "YES", the frame extraction unit 23E extracts frames from the audio data (Step S4). The buffer unit 23F buffers this audio data (Step S5), and outputs it to the packet generation unit 23G. Thereafter, the packet generation unit 23G packetizes the input audio data (Step S6), and outputs it to the transmission buffer unit 23H (Step S7).

The main control unit 23B determines whether or not there is any audio data that has not been subjected to the processes in Steps S4 to S7 (Step S11). If the determination result in Step S11 is "YES", the process returns to Step S3.

If the determination result in Step S11 is "NO", the time management unit 23K determines whether or not the transmission time, which corresponds to the transmission time t above, of the audio data stored in the transmission buffer unit 23H has been concluded (Step S12). If the determination result in Step S12 is "NO", the process proceeds to Step S16, which will be described later. If the determination result in Step S12 is "YES", a determination is made on whether the transmission buffer unit 23H is buffering any audio data (Step S13).

If the determination result in Step S13 is "YES", the transmission buffer unit 23H outputs to the Bluetooth communication unit 30 the packet for which the time management unit 23K has sent a transmission instruction, and the packet is sent to the headset by the Bluetooth communication unit 30 through the Bluetooth antenna 31 (Step S14). If the determination result in Step S13 is "NO", the time management unit 23K adds the transmission delay time T to the transmission time t (Step S15).

After the process in Step S14 or S15, the jitter control unit 23J determines whether an underflow occurs at the transmission buffer unit 23H (Step S16). The determining method will be described later. If the determination result in Step S16 is "NO", the process returns to Step S12. If the determination result is "YES", the process returns to Step S2.

In Step S16, the jitter control unit 23J compares the amount of audio data buffered in the transmission buffer unit 23H with a predetermined threshold value, and thereby determines whether or not an underflow occurs at the transmission buffer unit 23H. More specifically, the jitter control unit 23J determines that an underflow has occurred at the transmission buffer unit 23H when the amount of audio data buffered in the transmission buffer unit 23H is equal to or below the predetermined threshold value.

In Step S16, a first threshold is adopted as a predetermined value to make a determination on the occurrence of underflow at the transmission buffer unit 23H. The first threshold is used if the determination result in Step S1 is "YES", or in other words when the input data is video content constituted by audio data and video data.

Here, the first threshold is different from that used to determine whether or not the audio data has overflowed.

The threshold for the buffering amount that is referred to when determining the occurrence of an underflow at the transmission buffer unit 23H is set to different values when processing video content and when processing music content. Hence, an appropriate threshold can be adopted in accordance with the type of content.

When dealing with video content, the image reproduced on the display 28 of the cellular telephone and the voice reproduced on the headset need to be synchronized as much as possible to minimize the discrepancy between the two reproduction times. For this reason, it is preferable to minimize the amount of data buffered in the transmission buffer unit 23H. Thus, the first threshold is set to a smaller value than that of the second threshold.

If the determination result in Step S3 is "NO", the frame extraction unit 23E extracts frames from the audio data (Step S8). Thereafter, the time management unit 23K subtracts the transmission delay time T from the time measured by the timer in order to synchronize the image reproduced on the display 28 of the cellular telephone and the voice reproduced on the headset thereof (Step S9). In other words, Step S9 is a step at which the time management unit 23K makes a correction to the time measured by the timer so as to achieve synchronization between the image reproduced on the display 28 of the cellular telephone and the voice reproduced on the headset thereof.

Then, the jitter control unit 23J controls over the frame containing audio data extracted in Step S8 and discards the extracted frame with delayed so as not to buffer in the buffer unit 23F (Step S10). Thereafter, the process proceeds to Step S11 as described above.

As explained above, when the content to be processed for reproduction is video content including audio data and video data, the voice reproduced on and output from the headset is free from annoying intermittent sound skipping. Furthermore, the image reproduced on the display 28 and the voice reproduced on the headset are reliably brought into synchronization with each other.

If the determination result in Step S1 is "NO", that is, the content to be processed is music content constituted by audio data, the main control unit 23B determines whether or not the audio data of the music content to be processed has been input from the compander 17 (Step S22). If the determination result in Step S22 is "NO", the process proceeds to Step S32, which will be described later.

If the determination result in Step S22 is "YES", the processes of Steps S24 through S27 are executed. The processes of Steps S24 through S27 are the same as the processes of Steps S4 through S7 that have been discussed above, and thus the explanation of these processes are omitted.

After the process in Step S27, the main control unit 23B determines whether or not there is any audio data that are not subjected to the processes in Steps S24 through S27 (Step S31). If the determination result in Step S31 is "YES", the process returns to Step S24.

If the determination result in Step S31 is "NO", the time management unit 23K determines whether or not the transmission time of the audio data has been concluded in accordance with the timer function (whether or not the transmission time t has arrived) (Step S32). If the determination result in Step S32 is "NO", the process proceeds to Step S36. If the determination result in Step S32 is "YES", a determination is made on whether there is any audio data buffered by the transmission buffer unit 23H (Step S33).

If the determination result in Step S33 is "YES", the transmission buffer unit 23H outputs to the Bluetooth communication unit 30 the packet that the time management unit 23K has instructed to transmit, and the Bluetooth communication unit 30 and the Bluetooth antenna 31 transmits the packet to the headset (Step S34).

If the determination result in Step S32 or S33, or after the process is performed in Step S34, is "NO", the jitter control unit 23J determines whether or not an underflow occurs at the transmission buffer unit 23H, with the aforementioned method (Step S36). If the determination result in Step S36 is "YES", the process proceeds to Step S22 to recover from the underflow. If the determination result in Step S36 is "NO", the process proceeds to Step S32, where the transmission buffer unit 23H waits for the next transmission instruction.

In Step S36, the second threshold is incorporated, as explained above, as a predetermined threshold that is used to determine whether or not there is any underflow at the transmission buffer unit 23H.

According to the present embodiment, a portable device is offered, which is free from annoying sound skips and a discrepancy between reproduced sound and image when audio data of music content or video content is transmitted from the portable device such as a cellular telephone to an external remote device such as a headset to reproduce and output.

More specifically, according to the present embodiment, if audio data of music content is transmitted from a portable device such as a cellular telephone to an external remote device such as a headset to reproduce and output, the audio data is stopped from being transmitted to the external remote device in the case of an underflow at the transmission buffer unit 23H of the portable device, until the device recovers from the underflow. Annoying sound skips related to the underflow can be thereby prevented from occurring at the transmission buffer unit 23H of the portable terminal device.

In addition, according to the present embodiment, if audio data of video content is transmitted from a portable device such as a cellular telephone to an external remote device such as a headset to reproduce and output, the audio data is stopped from being transmitted to the external remote device until the device recovers from the underflow, and the audio data is discarded without being buffered during that period of time, in the case of an underflow at the transmission buffer unit 23H of the portable device.

Annoying sound skips related to the underflow can be thereby prevented from occurring at the transmission buffer unit 23H of the portable device. Furthermore, synchronization can be reliably maintained between the image continuously reproduced and output to the display 28 and the sound reproduced and output to the external remote device, without being affected by the underflow.

Still further, the present invention according to the embodiment determines whether the audio data transmitted from the portable device such as a cellular telephone to the external remote device such as a headset is included in music content or video content. Hence, the invention performs control suitably in accordance with the type of content, and remarkably improves the convenience to users.

In the above explanation, an example of using Bluetooth as a short-range communication technology is introduced. However, the present invention is not limited to Bluetooth. For instance, wireless LAN adopting IEEE 802.11 or IEEE 802.16 standards may be used to realize the present embodiment.

The present invention has been explained based on an embodiment, but should not be limited thereto. It should be noted that the present invention can be embodied in various modes and applications without departing from the scope or gist of the invention.

Furthermore, the aforementioned embodiment includes various stages of the invention, and various inventions may be achieved by suitably combining some of the disclosed structural components. For example, if some of the structural components are omitted from the entire structure indicated in the embodiment but the partially omitted structure can solve the problems discussed in the Brief Summary of the Invention and reach the advantages as discussed in the Detailed Description of the Invention, this structure may be extracted as an invention.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A portable device comprising:
   a storage unit for storing audio data and video data;
   a content type determining unit for determining a type of content that is to be subjected to a reproduction process whether the type of content is video content or audio content;
   a short-range wireless communication unit for transmitting the audio data of the content to an external device having a short-range communication function in short-range wireless communication;
   a transmission buffer unit for buffering the audio data that is to be transmitted to the external device by the short-range wireless communication unit and outputting the audio data to the short-range wireless communication unit;
   a time management unit having a timer function, for sending the transmission buffer unit an instruction of transmitting the audio data to the short-range wireless communication unit based on time measured by the timer function; and
   a jitter control unit for determining whether an underflow arises at the transmission buffer unit and, when determining that the underflow arises at the transmission buffer unit, controlling the transmission buffer unit in such a manner as not to output the audio data currently buffered in the transmission buffer unit to the short-range wireless communication unit,
   wherein, when the content type determining unit determines that the content to be subjected to the reproduction process contains the video data and when the underflow arises at the transmission buffer unit, the jitter control unit discards the audio data that is not output to the short-range wireless communication unit at a time indicated by the time management unit,
   wherein, when the content type determining unit determines that the content to be subjected to the reproduction process does not contain the video data and when the underflow arises at the transmission buffer unit, the jitter control unit controls the transmission buffer unit in such a manner as to output the audio data to the short-range wireless communication unit after the transmission buffer unit recovers from the underflow,
   wherein the jitter control unit determines that the underflow arises at the transmission buffer unit when an amount of data buffered in the transmission buffer unit is equal to or below a predetermined threshold,
   wherein the predetermined threshold is set in accordance with a determination result made by the content type determining unit,
   wherein, when the input data is video content constituted by audio data and video data, a first threshold is used to determine, by the jitter control unit, whether the underflow arises at the transmission buffer unit, wherein, when the input data is music content, a second threshold value is used, and wherein the first threshold is different from the second threshold, and the first threshold is smaller than the second threshold.

2. A portable device comprising:
a storage unit configured to store a first content containing audio data and video data and a second content containing only audio data;
a video control unit configured to decode the video data and output the decoded video data to a display;
a short-range communication unit configured to connect an external device and to transmit the audio data contained in first and second contents to the external device;
a content type determining unit configured to determine whether the content to be reproduced is the first content containing audio data and video data or the second content containing only audio data;
a buffer unit configured to buffer the audio data to be transmitted to the external device via the short-range communication unit;
a timer configured to generate time information;
a timing control unit configured to control transmission of the audio data in the buffer unit based on the time information; and
a flow control unit configured to control the transmission of the audio data so as not to have the audio data in the buffer unit transmitted if underflow of the audio data in the buffer unit is detected and the content type determining unit determines that the content to be reproduced is the first content,
wherein, when content to be subjected to a reproduction process contains video data and when the underflow arises at the buffer unit, audio data that is not output at a time indicated by the time management unit is discarded,
wherein, when the content type determining unit determines that the content to be subjected to the reproduction process does not contain the video data and when the underflow arises at the buffer unit, the flow control unit controls the buffer unit in such a manner as to output the audio data to the short-range wireless communication unit after the buffer unit recovers from the underflow,
wherein the flow control unit determines that the underflow arises at the buffer unit when an amount of data buffered in the buffer unit is equal to or below a predetermined threshold,
wherein the predetermined threshold is set in accordance with a determination result made by the content type determining unit,
wherein, when the input data is video content constituted by audio data and video data, a first threshold is used to determine, by the flow control unit, whether the underflow arises at the transmission buffer unit,
wherein, when the input data is music content, a second threshold value is used, and wherein the first threshold is different from the second threshold, and the first threshold is smaller than the second threshold.

3. The portable device according to claim 2, wherein the flow control unit controls the transmission of the audio data so as to have the audio data in the buffer unit transmitted if underflow of the audio data in the buffer is detected and the content type determining unit determines that the content data to be reproduced is the second content.

4. The portable device according to claim 3, wherein the external device is a headset.

5. A method for controlling data transmission, comprising:
storing a first content containing audio data and video data and a second content containing only audio data;
decoding the video data and outputting the decoded video data to a display;
connecting an external device and transmitting the audio data contained in the first and second contents to the external device;
determining whether the content to be reproduced is the first content containing audio data and video data or the second content containing only audio data;
buffering the audio data to be transmitted to the external device;
generating time information;
controlling transmission of the audio data based on the time information; and
controlling the transmission of the audio data so as not to have the audio data transmitted if underflow of the audio data is detected and it is determined that the content to be reproduced is the first content,
wherein, when content to be subjected to a reproduction process contains video data and when the underflow arises at the transmission buffer unit, audio data that is not output at a time indicated by the time management unit is discarded,
wherein, when it is determined that the content to be subjected to the reproduction process does not contain the video data and when the underflow arises, the transmission of the audio is controlled in such a manner as to output the audio data after it is determined that the underflow has ended,
wherein it is determined that the underflow arises when an amount of data buffered is equal to or below a predetermined threshold,
wherein the predetermined threshold is set such that when the input data is video content constituted by audio data and video data, a first threshold is used to determine whether the underflow arises and when the input data is music content, a second threshold value is used, and
wherein the first threshold is different from the second threshold, and the first threshold is smaller than the second threshold.

6. The method according to claim 5, wherein the transmission of the audio data is controlled so as to have the audio data transmitted if underflow of the audio data is detected and it is determined that the content data to be reproduced is the second content.

7. The method according to claim 5, wherein the external device is a headset.

* * * * *